United States Patent
Fukuda et al.

(10) Patent No.: US 10,644,507 B2
(45) Date of Patent: May 5, 2020

(54) MANAGEMENT APPARATUS, MANAGEMENT METHOD, AND MANAGEMENT PROGRAM

(71) Applicant: Panasonic Intellectual Property Management Co., Ltd., Osaka (JP)

(72) Inventors: Naohiro Fukuda, Chiba (JP); Yoshiaki Matsumoto, Saitama (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 69 days.

(21) Appl. No.: 15/735,837

(22) PCT Filed: May 25, 2016

(86) PCT No.: PCT/JP2016/002524
§ 371 (c)(1),
(2) Date: Dec. 12, 2017

(87) PCT Pub. No.: WO2016/203714
PCT Pub. Date: Dec. 22, 2016

(65) Prior Publication Data
US 2018/0175620 A1     Jun. 21, 2018

(30) Foreign Application Priority Data

Jun. 17, 2015  (JP) ................. 2015-122098

(51) Int. Cl.
*H02J 3/14* (2006.01)
*H02J 3/46* (2006.01)
(Continued)

(52) U.S. Cl.
CPC ............... *H02J 3/14* (2013.01); *G05B 15/02* (2013.01); *G05F 1/66* (2013.01); *G06Q 10/063* (2013.01);
(Continued)

(58) Field of Classification Search
CPC .. H02J 3/14; H02J 3/46; H02J 13/0006; H02J 13/0017; G05B 15/02; G05F 1/66;
(Continued)

(56) References Cited

U.S. PATENT DOCUMENTS 3,872,286 A * 3/1975 Putman .................. G06Q 50/06
705/412
4,141,069 A * 2/1979 Fox ........................... H02J 3/14
307/52

(Continued)

FOREIGN PATENT DOCUMENTS

JP   2008295193   * 12/2008 .............. H02J 13/00
JP   2011078238   *  4/2011 ................ H02J 3/00
(Continued)

OTHER PUBLICATIONS

International Search Report issued in Application No. PCT/JP2016/002524 dated Jul. 19, 2016, with English translation.

*Primary Examiner* — Rocio Del Mar Perez-Velez
*Assistant Examiner* — Alicia M. Choi
(74) *Attorney, Agent, or Firm* — McDermott Will & Emery LLP

(57) ABSTRACT

Deriver extracts, based on a power adjustment quantity provided from a power supply utility, a plurality of candidate combinations of power facilities that are candidates that achieve the power adjustment quantity from among a plurality of power facilities. Deriver derives a group of candidate combinations of power facilities that includes the plurality of candidate combinations of power facilities extracted. Selector selects a combination of power facilities that achieves the power adjustment quantity from among the group of candidate combinations of power facilities based (Continued)

on response information of each power facility in the past, the response information being information in response to a DR request.

6 Claims, 15 Drawing Sheets

(51) Int. Cl.
    *G06Q 50/06*     (2012.01)
    *G05F 1/66*     (2006.01)
    *H02J 13/00*     (2006.01)
    *G06Q 10/06*     (2012.01)
    *G05B 15/02*     (2006.01)

(52) U.S. Cl.
    CPC ................ *G06Q 50/06* (2013.01); *H02J 3/46* (2013.01); *H02J 13/0006* (2013.01); *H02J 13/0017* (2013.01); *Y02B 70/3225* (2013.01); *Y04S 20/222* (2013.01)

(58) Field of Classification Search
    CPC ...... G06Q 10/063; G06Q 50/06; G06Q 10/06; Y02B 70/3225; Y04S 20/222
    USPC ......................................................... 700/295
    See application file for complete search history.

(56) References Cited

U.S. PATENT DOCUMENTS

| | | | | |
|---|---|---|---|---|
| 4,204,127 A * | 5/1980 | Carter, II | ............... | H02J 3/14 307/35 |
| 8,806,239 B2 * | 8/2014 | Forbes, Jr. | ............. | G01D 4/004 713/300 |
| 9,248,752 B2 * | 2/2016 | Kuribayashi | ............. | G06F 1/26 |
| 9,461,471 B2 * | 10/2016 | Forbes, Jr. | ............. | G05B 15/02 |
| 9,691,076 B2 * | 6/2017 | McCurnin | .......... | G06Q 30/0202 |
| 9,692,259 B2 * | 6/2017 | Boss | ..................... | G06F 1/3209 |
| 9,792,568 B2 * | 10/2017 | Chen | ................ | G06Q 10/06312 |
| 2004/0117330 A1 * | 6/2004 | Ehlers | ..................... | G06Q 10/10 705/412 |
| 2007/0043478 A1 * | 2/2007 | Ehlers | ...................... | F24F 11/30 700/276 |
| 2009/0240381 A1 * | 9/2009 | Lane | ......................... | H02J 3/14 700/296 |
| 2010/0314942 A1 * | 12/2010 | Talkin | ..................... | G06Q 50/06 307/41 |
| 2011/0258018 A1 * | 10/2011 | Tyagi | ..................... | G06Q 30/02 705/7.33 |
| 2012/0065805 A1 * | 3/2012 | Montalvo | ............. | G06Q 10/06 700/297 |
| 2014/0086067 A1 * | 3/2014 | Yamamori | .......... | H04L 43/0823 370/242 |
| 2014/0277795 A1 * | 9/2014 | Matsuoka | .......... | G06Q 30/0202 700/291 |
| 2014/0358470 A1 * | 12/2014 | Miura | ...................... | B60L 53/11 |
| 2015/0088315 A1 * | 3/2015 | Behrangrad | .............. | H02J 3/14 320/109 |
| 2016/0137087 A1 * | 5/2016 | Haas | ......................... | H02J 3/14 320/109 |
| 2016/0274653 A1 * | 9/2016 | Mydlil | ...................... | G06F 1/26 |
| 2017/0136908 A1 * | 5/2017 | Ricci | ................... | B60L 11/1831 |

FOREIGN PATENT DOCUMENTS

| | | |
|---|---|---|
| JP | 2011-229374 A | 11/2011 |
| JP | 2013-240154 A | 11/2013 |
| JP | 2014-033594 A | 2/2014 |
| JP | 2014-124065 A | 7/2014 |
| JP | 2014-150627 A | 8/2014 |
| JP | 2014-233103 A | 12/2014 |

* cited by examiner

FIG. 3

| L0 | L1 | L2 |
|---|---|---|
| [0:5) | [5:10) | [10:] |

(L0: 0 YEN OR MORE AND LESS THAN 5 YEN,
L1: 5 YEN OR MORE AND LESS THAN 10 YEN,
L2: 10 YEN OR MORE)

FIG. 4

| POWER FACILITY ID | Mode | | | |
|---|---|---|---|---|
| | 0 | 1 | 2 | 3 |
| Be[0] | 10 [kW] | 15 [kW] | 20 [kW] | 30 [kW] |
| Be[1] | 10 [kW] | 15 [kW] | 25 [kW] | 35 [kW] |
| Be[2] | 10 [kW] | 30 [kW] | 40 [kW] | 50 [kW] |
| ... | ... | ... | ... | ... |
| Be[k] | 0 [kW] | 2 [kW] | 5 [kW] | 7 [kW] |
| ... | ... | ... | ... | ... |
| Be[n] | 0 [kW] | 1 [kW] | 1.5 [kW] | 2 [kW] |

FIG. 5

| POWER FACILITY ID | OPT-IN RATE PER PRICE RANGE (r) | | |
|---|---|---|---|
| | L0 | L1 | L2 |
| Be[0] | 20 [%] | 50 [%] | 86 [%] |
| Be[1] | 10 [%] | 60 [%] | 87 [%] |
| Be[2] | 40 [%] | 70 [%] | 97 [%] |
| ... | ... | ... | ... |
| Be[k] | 20 [%] | 70 [%] | 86 [%] |
| ... | ... | ... | ... |
| Be[n] | 20 [%] | 55 [%] | 90 [%] |

FIG. 6

| POWER FACILITY ID | EXECUTING RATE (e) |
|---|---|
| Be[0] | 80 [%] |
| Be[1] | 60 [%] |
| Be[2] | 70 [%] |
| ... | ... |
| Be[k] | 55 [%] |
| ... | ... |
| Be[n] | 49 [%] |

| POWER FACILITY ID | OPT-IN RATE AT PRICE RANGE L0 (r) | EXECUTING RATE (e) | PRIORITY (v) |
|---|---|---|---|
| Be[0] | 20 [%] | 80 [%] | 1600 (MEDIUM) |
| Be[1] | 10 [%] | 60 [%] | 600 (LOW) |
| Be[2] | 40 [%] | 70 [%] | 2800 (HIGH) |

(b)

| POWER FACILITY ID | OPT-IN RATE AT PRICE RANGE L0 (r) | EXECUTING RATE (e) | PRIORITY ORDER (p) |
|---|---|---|---|
| Be[0] | 20 [%] | 80 [%] | 2 |
| Be[1] | 10 [%] | 60 [%] | 3 |
| Be[2] | 40 [%] | 70 [%] | 1 |

| POWER FACILITY ID | OPT-IN RATE PER PRICE RANGE (r) | | | EXECUTING RATE (e) | PRIORITY (v) |
|---|---|---|---|---|---|
| | L0 | L1 | L2 | | |
| Be[0] | 20 [%] | 50 [%] | 86 [%] | 80 [%] | 1600 (MEDIUM) |
| Be[1] | 10 [%] | 60 [%] | 87 [%] | 60 [%] | 600 (LOW) |
| Be[2] | 40 [%] | 70 [%] | 97 [%] | 70 [%] | 2800 (HIGH) |
| ... | ... | ... | ... | ... | ... |
| Be[k] | 20 [%] | 70 [%] | 86 [%] | 55 [%] | 1100 |
| ... | ... | ... | ... | ... | ... |
| Be[n] | 20 [%] | 55 [%] | 90 [%] | 49 [%] | 980 |

RESULT OF CALCULATION IN S222

US 10,644,507 B2

MANAGEMENT APPARATUS, MANAGEMENT METHOD, AND MANAGEMENT PROGRAM

RELATED APPLICATIONS

This application is the U.S. National Phase under 35 U.S.C. § 371 of International Application No. PCT/jP2016/002524, filed on May 25, 2016, which claims priority to Japanese Application No. 2015-122098, filed Jun. 17, 2015, the disclosures of which are incorporated by reference herein in their entirety.

TECHNICAL FIELD

The present invention relates to a management apparatus, a management method, and a management program.

BACKGROUND ART

So-called demand response (DR) is known that enables a stable power supply as a result of a power consuming utility adjusting the amount of power usage or the amount of power generation in response to a request from the power supply utility side such as an electric power company.

The power supply utility side provides an instruction for a required amount of power reduction or power generation to an aggregator (or directly to a consuming utility), and the aggregator provides the required amount to a consuming utility (or an aggregator) in the form of a demand response. At this time, in order to achieve the required amount required by the power supply utility side, the aggregator needs to accurately allocate and request the amount of power reduction or power generation to the consuming utility. For this reason, the aggregator first needs to select, from among a plurality of consuming utilities (power facilities that are power consuming facilities or power generation facilities (also referred to as "resource")), a consuming utility (power facility) to which "power reduction quantity/power generation quantity" is provided.

It is often the case that the selection of the consuming utility (power facility) by the aggregator so as to achieve the required amount required by the power supply utility side is based on know-how that relies on human judgement based on the actual reduction or power generation achievement, weather conditions, and the like in the past corresponding to the reduction level or power generation level of the power facility. However, it is difficult to cope with a change of the consuming utility or an increase in the number of consuming utilities, and there is a need for an automatic consuming utility selection technique by an aggregator.

In recent years, a technique has been proposed for automatically planning a power reduction or power generation demand response event on the power supply utility side by grouping consuming utilities into consuming utility groups based on past demand-response data of the consuming utility side, and selecting and using a consuming utility group (see Patent Literature (PTL) 1).

CITATION LIST

Patent Literature

PTL 1: Japanese Unexamined Patent Application Publication No. 2011-229374

SUMMARY OF THE INVENTION

Technical Problems

However, the technique disclosed in PTL 1 is a technique for automatically planning a power reduction or power generation demand response event on the power supply utility side by selecting a consuming utility group from among the consuming utility groups that have already been grouped and fixed. This technique cannot be applied to the automatic consuming utility selection technique by an aggregator described above.

Under the above-described circumstances, it is an object of the present invention to provide a management apparatus, a management method, and a management program that enables an aggregator to automatically select a combination of power consuming utilities (power facilities) that is more accurate to achieve a power adjustment quantity provided from the power supply utility side.

Solutions to Problem

In order to solve the problem described above, a management apparatus that is a first aspect of the present invention is a management apparatus included in an aggregator that transmits a demand response request for power quantity adjustment to a plurality of power facilities that are power consuming utilities, the management apparatus including: a first acquirer that acquires instruction information including a power adjustment quantity transmitted from a power supply utility; a second acquirer that acquires, from response state information regarding a state of response to the demand response request transmitted from the plurality of power facilities, response information including acceptance information and power adjustment achievement information of the plurality of power facilities, the acceptance information being information regarding a state of acceptance of incentive for power adjustment in a past; a deriver that extracts, based on the instruction information, a plurality of candidate combinations of power facilities that are candidates that achieve the power adjustment quantity from among the plurality of power facilities, and derives a group of candidate combinations of power facilities that includes the plurality of candidate combinations of power facilities extracted; and a selector that selects, based on the response information, a combination of power facilities that achieves the power adjustment quantity from among the group of candidate combinations of power facilities.

In order to solve the problem described above, a management method that is a second aspect of the present invention is a management method that is executed by a management apparatus included in an aggregator that transmits a demand response request for power quantity adjustment to a plurality of power facilities that are power consuming utilities, the management method including: acquiring instruction information including a power adjustment quantity transmitted from a power supply utility; acquiring, from response state information regarding a state of response to the demand response request transmitted from the plurality of power facilities, response information including acceptance information and power adjustment achievement information of the plurality of power facilities, the acceptance information being information regarding a state of acceptance of incentive for power adjustment in a past; extracting, based on the instruction information, a plurality of candidate combinations of power facilities that are candidates that achieve the power adjustment quantity from among the plurality of power facilities, and deriving a group of candidate combinations of power facilities that includes the plurality of candidate combinations of power facilities extracted; and selecting, based on the response information, a combination of power facilities that achieves the power adjustment quantity from among the group of candidate combinations of power facilities.

In order to solve the problem described above, a management program that is a third aspect of the present invention is a management program for causing a computer to function as a management apparatus included in an aggregator that transmits a demand response request for power quantity adjustment to a plurality of power facilities that are power consuming utilities, the management program causing the computer to function as: a first acquirer that acquires instruction information including a power adjustment quantity transmitted from a power supply utility; a second acquirer that acquires, from response state information regarding a state of response to the demand response request transmitted from the plurality of power facilities, response information including acceptance information and power adjustment achievement information of the plurality of power facilities, the acceptance information being information regarding a state of acceptance of incentive for power adjustment in a past; a deriver that extracts, based on the instruction information, a plurality of candidate combinations of power facilities that are candidates that achieve the power adjustment quantity from among the plurality of power facilities, and derives a group of candidate combinations of power facilities that includes the plurality of candidate combinations of power facilities extracted; and a selector that selects, based on the response information, a combination of power facilities that achieves the power adjustment quantity from among the group of candidate combinations of power facilities.

Advantageous Effects of Invention

According to the present invention, it is possible to provide a management apparatus, a management method, and a management program that enables an aggregator to automatically select a combination of power consuming utilities (power facilities) that is more accurate to achieve a power adjustment quantity provided from the power supply utility side.

BRIEF DESCRIPTION OF DRAWINGS

FIG. 3 is a diagram showing a price range table used by the management apparatus according to the embodiment of the present invention.

FIG. 4 is a diagram showing a control mode table used by the management apparatus according to the embodiment of the present invention.

FIG. 5 is a diagram showing an opt-in rate table used by the management apparatus according to the embodiment of the present invention.

FIG. 6 is a diagram showing an executing rate table used by the management apparatus according to the embodiment of the present invention.

FIG. 9 is a diagram illustrating priority and priority order used by the management apparatus according to the embodiment of the present invention.

DESCRIPTION OF EXEMPLARY EMBODIMENT

Figure 1:
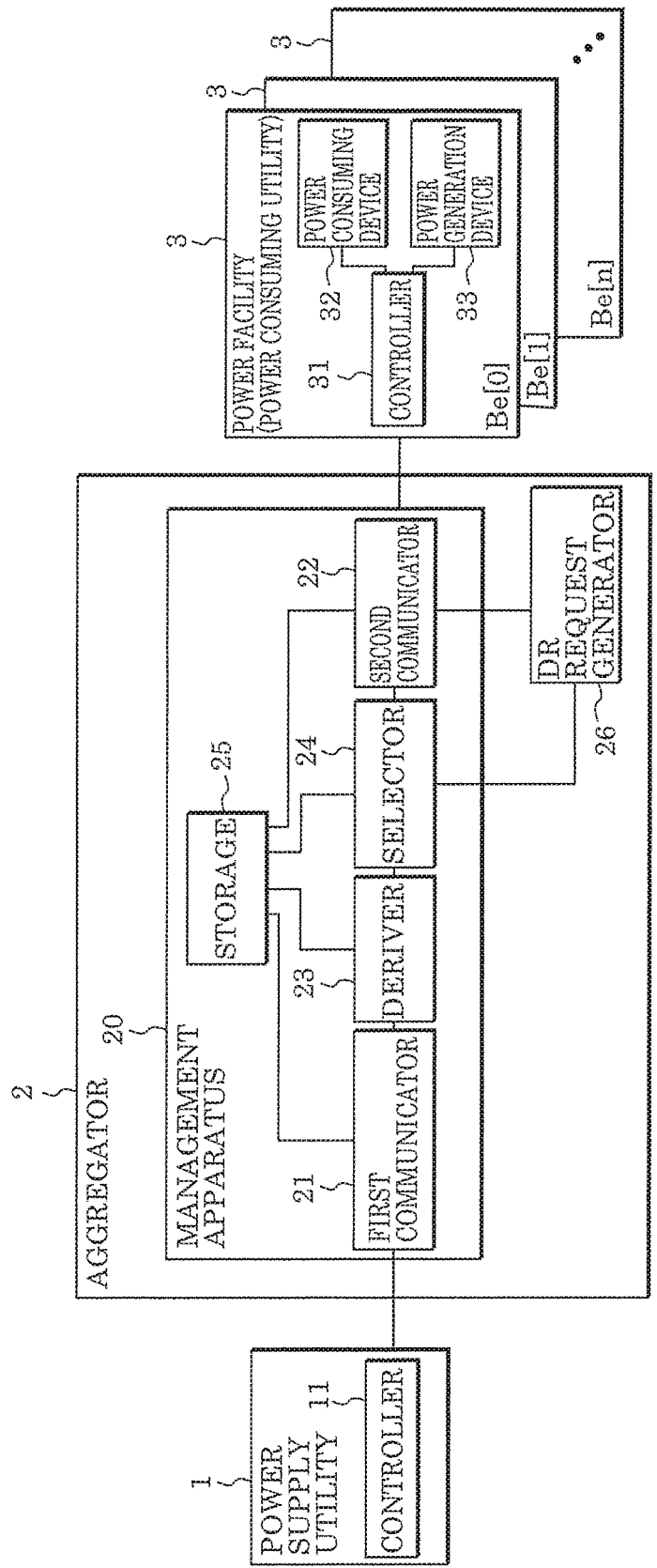
FIG. 1 is a block diagram illustrating a basic configuration of a demand response system that includes a management apparatus according to an embodiment of the present invention.

Hereinafter, a management apparatus and the like according to an embodiment of the present invention will be described with reference to the drawings. The embodiment described below shows a preferred specific example of the present invention. Accordingly, the numerical values, shapes, structural elements, the arrangement and connection of the structural elements, steps, the order of the steps, and the like shown in the following embodiment are merely examples, and therefore do not limit the scope of the present invention. Accordingly, among the structural elements described in the following embodiment, structural elements not recited in any one of the independent claims are described as arbitrary structural elements. The diagrams are schematic representations, and thus are not necessarily true to scale.

In the description of the diagrams given below, structural elements that are the same or similar are given the same reference numerals, and a redundant description may be omitted.

Embodiment

FIG. 1 is a diagram showing a basic configuration of a demand response (DR) system in which a management apparatus according to the present embodiment is included in an aggregator. As shown in FIG. 1, the demand response system includes power supply utility 1 such as an electric power company, aggregator 2 including management apparatus 20, and a plurality of power facilities 3 that are power consuming utilities. The plurality of power facilities 3 receive supply of power from power supply utility 1 via a power system (not shown).

Power supply utility 1 includes controller 11. Controller 11 monitors the balance between the amount of power supply of power supply utility 1 and the amount of power demand of a power consuming utility. When the amount of power demand relatively increases, and it is expected that the balance between the amount of power supply and the amount of power demand cannot be maintained at a constant level, controller 11 transmits a power quantity adjustment request (instruction information) to aggregator 2. The power quantity adjustment request (instruction information) includes a required amount of power adjustment (power adjustment quantity), a period, and an incentive (compensation). Controller 11 is connected to aggregator 2 so as to be capable of communication via a communication protocol such as, for example, open ADR (Automated Demand Response).

As used herein, the power adjustment quantity (the required amount of power adjustment) includes a power reduction quantity and a power generation quantity. In the present embodiment, the adjustment of power quantity refers to the adjustment of at least one of power reduction quantity and power generation quantity.

Aggregator 2 includes management apparatus 20 and DR request generator 26. When aggregator 2 receives a power quantity adjustment request from controller 11 of power supply utility 1, aggregator 2 selects, by using management apparatus 20, a combination of power facilities 3 that achieves the power adjustment quantity indicated by the power quantity adjustment request. The selection is performed by using a price range table, a control mode table, an opt-in rate table, and an executing rate table that are strategy tables, which will be described later. Then, for each of power facilities 3 that constitute the selected combination of power facilities 3, aggregator 2 generates, by using DR request generator 26, a demand response request (DR request) for power quantity adjustment including information indicative of a period, a compensation (incentive), and a power adjustment quantity. Then, DR request generator 26 transmits the generated DR request to each of selected power facilities 3 via management apparatus 20.

Each power facility 3 includes controller 31 that is connected to management apparatus 20 of aggregator 2 so as to be capable of communication via a communication protocol such as, for example, open ADR, power consuming device 32 controlled by controller 31, and power generation device 33. Power facility 3 is an energy management system (EMS) that manages the amount of power usage of power consuming device 32, the amount of power generation of power generation device 33, and the like by using controller 31. Power facility 3 may include at least either power consuming device 32 or power generation device 33.

Controller 31 transmits control mode information indicative of a control mode to management apparatus 20. The control mode information is information indicative of a power adjustment quantity (a power reduction quantity or a power generation quantity) that can be achieved by power facility 3 in each control mode. Also, controller 31 controls power consuming device 32 and power generation device 33 in response to the received DR request, and transmits, to management apparatus 20, response state information of power facility 3 regarding the state of response to DR request. The response state information includes information indicative of whether or not DR request has been received (whether or not opt-in has been performed (accepted)), information indicative of accepted compensation, and information indicative of actually adjusted quantity (the actually achieved value when DR request was carried out). It is assumed that IDs Be[0] to Be[n] that are identifiers are respectively assigned to power facilities 3.

Figure 2:
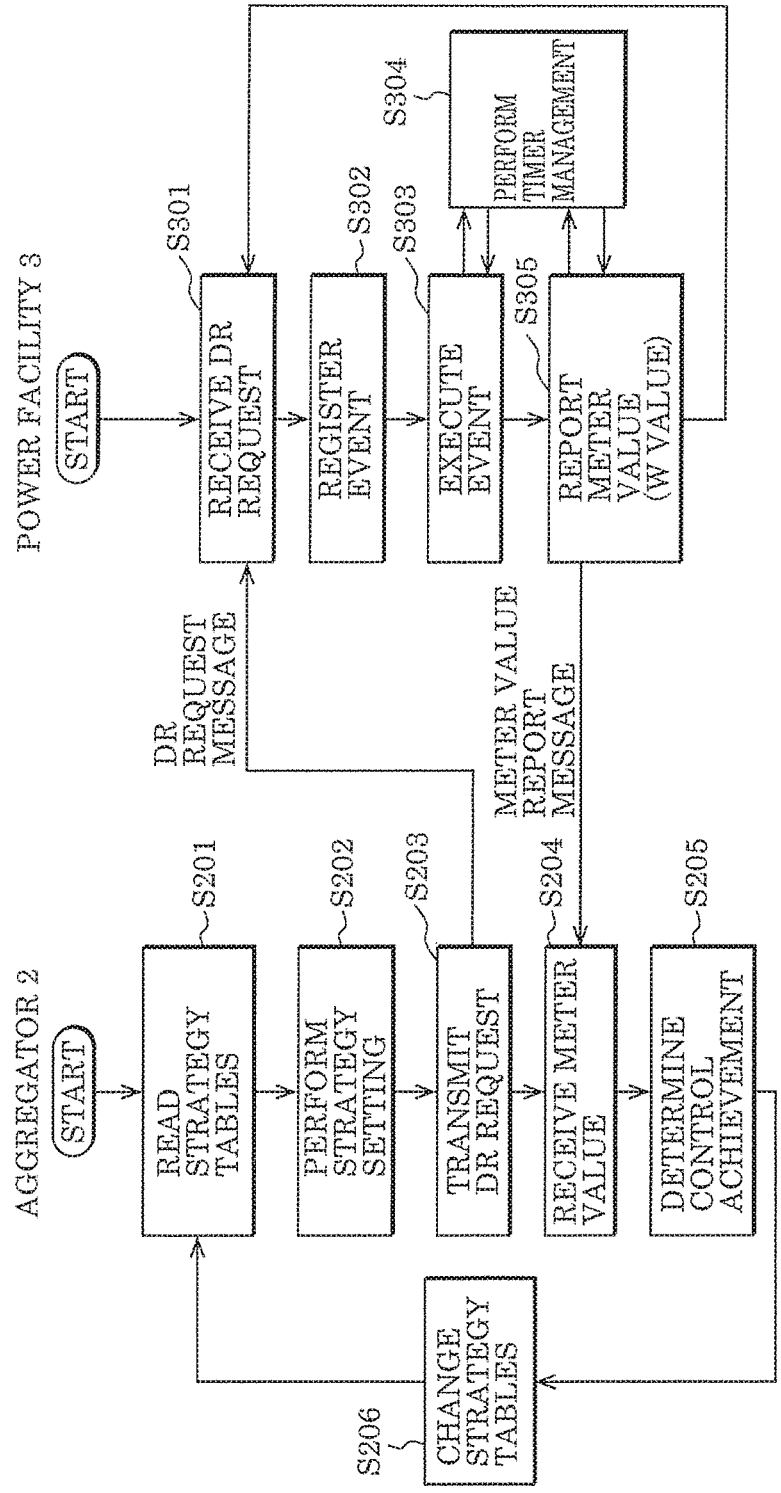
FIG. 2 is a flowchart illustrating schematic operations performed by an aggregator that includes the management apparatus according to the embodiment of the present invention.

FIG. 2 shows a schematic operation flowchart performed by aggregator 2 and a schematic operation flowchart performed by power facility 3. In aggregator 2, in step S201, a price range table, a control mode table, an opt-in rate table, and an executing rate table that are strategy tables are read. In the strategy setting performed in step S202, a combination of power facilities 3 (for example, a combination of Be[0], Be[2], and Be[4]) that achieves the power adjustment quantity indicated by a power quantity adjustment request from power supply utility 1 is selected. In step S203, with respect to the selected combination of power facilities 3, a DR request is generated based on the power quantity adjustment request from power supply utility 1, and the DR request is transmitted as a DR request message. In step S204, a meter value indicating the actually adjusted quantity in response to DR request (the actually achieved value when DR request was carried out) is received as a meter value report message from power facility 3. In step S205, control achievement is determined based on the received meter value. In step S206, changing and updating of the strategy tables is performed based on the result of the determination of control achievement.

In power facility 3, in step S301, the DR request message is received from aggregator 2. If power facility 3 accepts (opts in) the DR request, in step S302, an event is registered based on the DR request. In step S303, the registered event is executed according to period management (timer management) performed in step S304. In step S305, a meter value indicating an adjustment quantity as a result of executing the event (the actually achieved value when the DR request was carried out) is transmitted, as a meter value report message, to aggregator 2 according to the period management performed in step S304.

Next, management apparatus 20 provided in aggregator 2 will be described. As shown in FIG. 1, management apparatus 20 includes first communicator (first acquirer) 21 that performs communication with power supply utility 1, second communicator (second acquirer) 22 that performs communication with the plurality of power facilities 3, deriver 23, selector 24, and storage 25 (that also performs operation as the second acquirer). Management apparatus 20 may be implemented by a computer.

First communicator 21 is connected to controller 11 provided in power supply utility 1 so as to be capable of communication, and is configured to receive a power quantity adjustment request (instruction information) from controller 11, and acquire information indicative of a period, a power adjustment quantity, and a compensation. The power quantity adjustment request acquired by first communicator 21 is stored in storage 25.

Second communicator 22 is connected to controller 31 provided in each power facility 3 so as to be capable of communication. Second communicator 22 transmits a DR request to controller 31 of each of selected power facilities 3 selected as the combination of power facilities 3 that achieves the power adjustment quantity. Also, second communicator 22 acquires, from controller 31, control mode information of power facility 3, response state information to DR request of power facility 3, and the like. The response state information to DR request includes information indicative of whether or not DR request has been accepted (whether or not opt-in has been exercised), information indicative of accepted compensation, information indicative of actually adjusted quantity (the actually achieved value when DR request was carried out), and the like.

Storage 25 updates and stores the pride range table, which is a compensation table, as appropriate based on compensation information included in the power quantity adjustment request acquired by first communicator 21. FIG. 3 shows an example of the price range table. In this example, three different price ranges of L0, L1, and L2 are set. The price is a compensation for an adjustment quantity of 1 kW. Storage 25 stores the control mode information of power facility 3 acquired by second communicator 22 in the control mode table. FIG. 4 shows an example of the control mode table. In the example shown in FIG. 4, four control modes are set, and a power adjustment quantity (a power reduction quantity or a power generation quantity) available in each control mode is shown for each power facility 3. In the present embodiment, it is assumed that the power adjustment quantity is power reduction quantity.

Storage 25 generates and stores a table indicating acceptance information regarding the state of acceptance of incentive (compensation) based on the information indicative of whether or not DR request has been accepted by power facility 3 (whether or not opt-in has been exercised), and the information indicative of accepted compensation of power facility 3 that were acquired by second communicator 22. In this example, it is assumed that as the table indicating acceptance information regarding the state of acceptance of incentive, an opt-in rate table is updated and stored as appropriate, the opt-in rate table showing an opt-in rate that is the ratio of acceptance (opt-in) of DR request with respect to the presented compensation. The opt-in rate is an example of the rate of participation in incentive. FIG. 5 shows an example of the opt-in rate table. In the example shown in FIG. 5, opt-in rate r at each price range is shown for each power facility 3.

Also, storage 25 generates and stores therein an executing rate table as power adjustment achievement information based on the information indicative of actually adjusted quantity (the actually achieved value when DR request was carried out) of power facility 3 acquired by second communicator 22. FIG. 6 shows an example of the executing rate table. In this example, executing rate e of each power facility 3 is the ratio of the actually adjusted quantity (actually achieved value) with respect to the adjustment quantity provided to that power facility 3. In the example shown in FIG. 6, a total executing rate of all price ranges is shown, but an executing rate at each price range may be determined. Executing rate e and opt-in rate r constitute response information acquired by second communicator 22 and storage 25. The price range table, the control mode table, the opt-in rate table, and the executing rate table described here are the aforementioned strategy tables.

Deriver 23 extracts a plurality of candidate combinations of power facilities 3 that are candidates that achieve the power adjustment quantity provided from power supply utility 1 from among the plurality of power facilities 3. Then, derive 23 derives a group of candidate combinations of power facilities 3 including the plurality of extracted candidate combinations of power facilities 3. In the following description, an example will be described in which the power adjustment quantity provided from power supply utility 1 is a power reduction quantity of 40 kW, and the presented incentive (compensation) is 4 yen/kW. Also, in order to simplify the description, it is assumed here that there are only three power facilities 3 with power facility IDs of Be[0], Be[1], and Be[2], and the tables shown in FIGS. 3 to 6 are used as the strategy tables.

Figure 7:
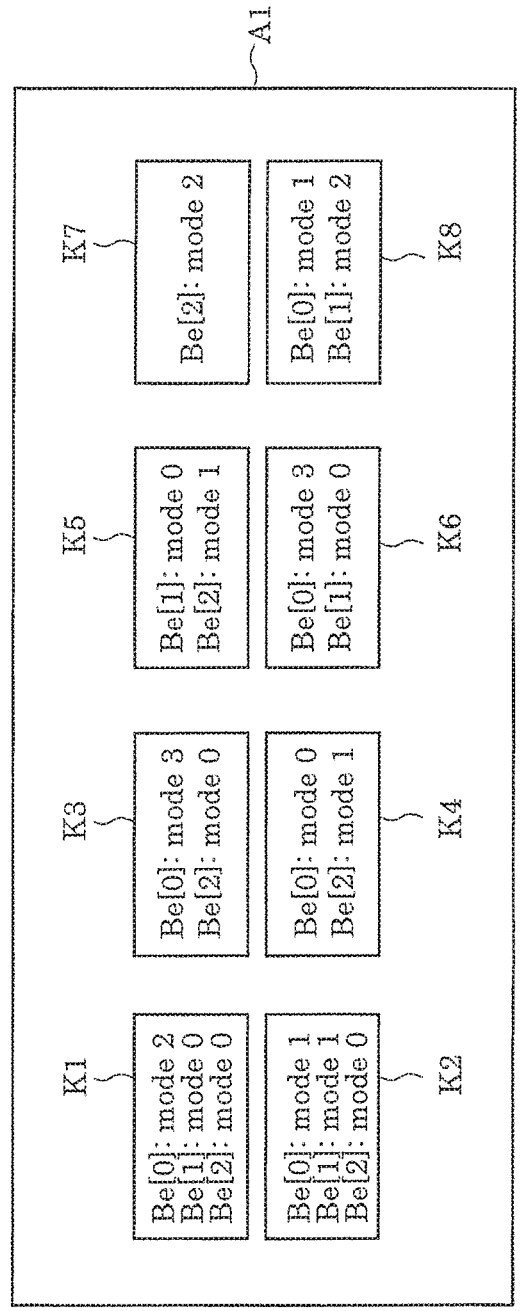
FIG. 7 is a diagram showing candidate combinations of power facilities extracted by the management apparatus according to the embodiment of the present invention.

Deriver 23 extracts candidate combinations of power facilities 3, each having a total power reduction quantity of 40 kW, by using the values corresponding to power facility IDs of Be[0], Be[1], and Be[2] in the control mode table shown in FIG. 4. FIG. 7 shows the candidate combinations of power facilities 3. In this example, it is assumed that eight candidates K1 to K8 have been extracted as the candidate combinations of power facilities 3, each having a total power reduction quantity of 40 kW. A group of candidates K1 to K8 is candidate combination group A1 of power facilities 3. Each of candidates K1 to K8 includes a set of power facility ID and control mode information (mode value) as an element. For example, candidate K1 includes three sets of (Be[0]: mode 2), (Be[1]: mode 0), and (Be[2]: mode 0) as the elements.

Selector 24 selects, from among candidates K1 to K8 of candidate combination group A1 of power facilities 3, a combination of power facilities 3 that achieves the power adjustment quantity provided from power supply utility 1. Candidate Kk selected in the manner described above is the combination of power facilities 3 that achieves the power adjustment quantity. The selection is made by using the opt-in rate table that shows opt-in rate r that is the acceptance information regarding the state of acceptance of incentive (compensation), and the executing rate table that shows executing rate e that is the power adjustment achievement information. In this example, first, priority v of each power facility 3 is derived by using the opt-in rate table and the executing rate table. Next, priority vk of each of K1 to K8 that are candidate combinations of power facilities 3 is derived by using priority v of each power facility 3, the total number of power facilities 3 that constitute candidate Kk, and the like. A combination of power facilities 3 that achieves the power adjustment quantity is selected in descending order of priority vk.

Figure 8:
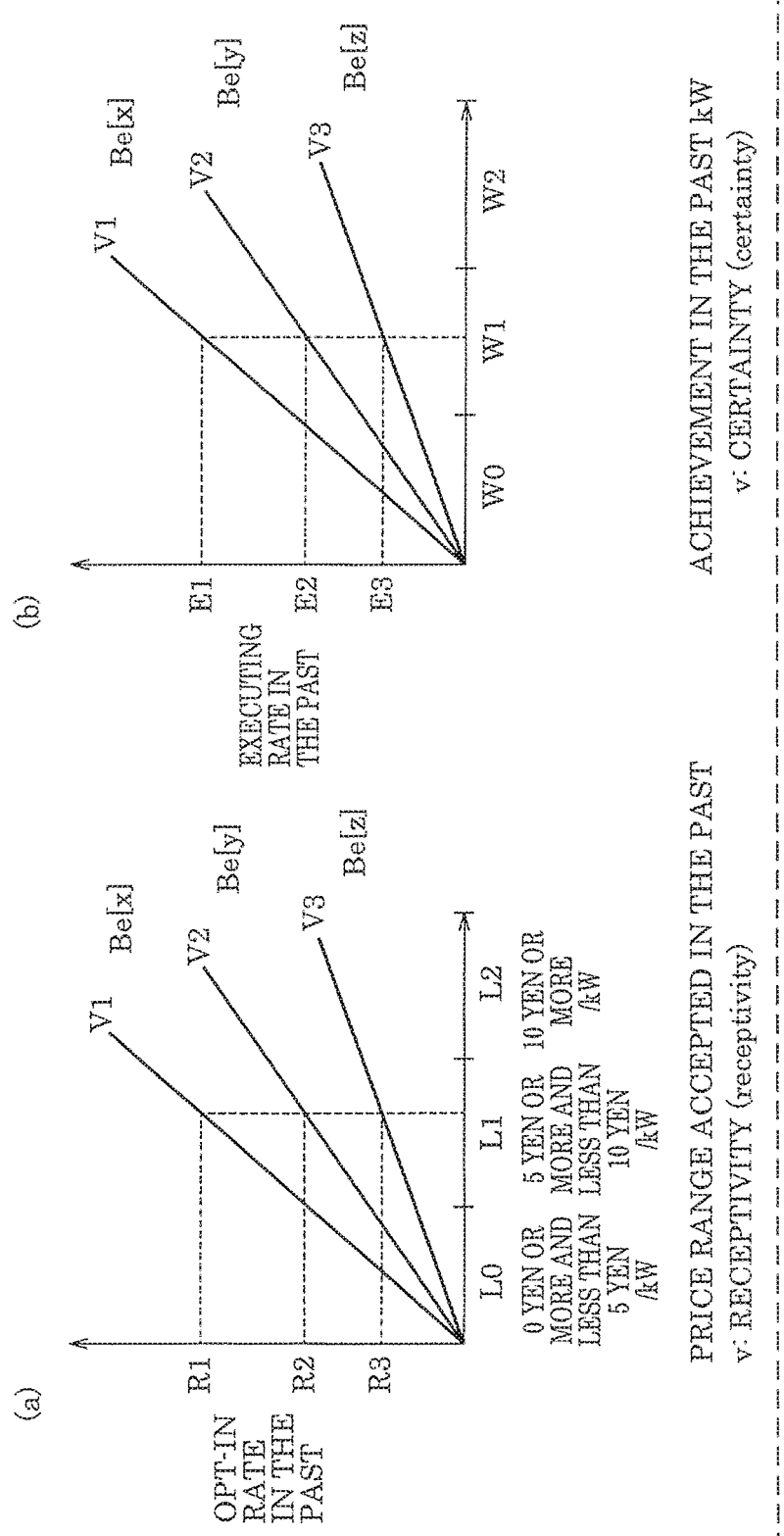
FIG. 8 is a diagram illustrating priority used by the management apparatus according to the embodiment of the present invention.

Here, the basic idea of priority (worth) v of each power facility 3 is shown in FIG. 8. As evaluation elements of priority v, receptivity shown in (a) in FIG. 8, and certainty shown in (b) in FIG. 8 are conceived. In the present embodiment, the product of receptivity and certainty, or to be specific, the product of [opt-in rate r at a given price range in the past] and [executing rate e in the past] of each power facility 3 is defined as priority v of each power facility 3. A priority table at price range L0 corresponding to the presented compensation (4 yen/kW) is shown in (a) in FIG. 9. Because priority v is the product of [opt-in rate r at price range L0] and [executing rate e], priority v of power facility Be[0] is calculated to be 1600 by multiplying 20 by 80. If executing rate e is also determined for each price range, executing rate e of each price range is the product of opt-in rate r at a given price range in the past and executing rate e at the given price range in the past. Priority v determined in the manner described above is converted to priority order p (1, 2, 3) that is a ranking value. A priority order table is shown in (b) in FIG. 9. In this example, power facility Be[2] ranks highest in the priority order, followed by power facility Be[0], and power facility Be[1] ranks lowest in the priority order.

Figure 10:
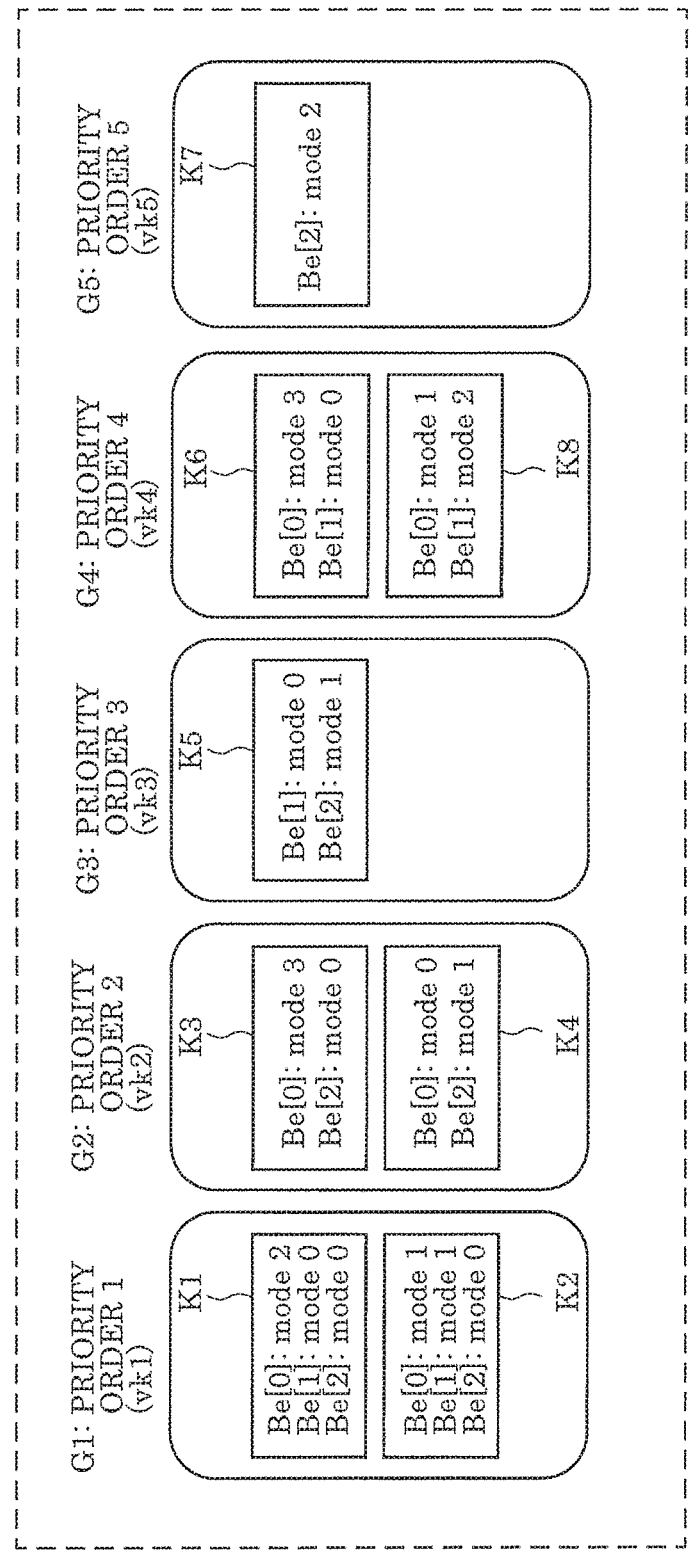
FIG. 10 is a diagram showing candidate combinations of power facilities that have been grouped according to the priority order used by the management apparatus according to the embodiment of the present invention.

As described above, selector 24 derives priority (priority order) vk of each of candidate combinations K1 to K8 of power facilities 3 based on priority order p of each power facility 3 and the total number of power facilities 3 that constitute candidate Kk (the total number of power facilities 3 that are elements of candidate Kk). Here, as an example, it is assumed that candidate Kk that has a larger number of power facilities 3 as elements and that includes power facility 3 having higher priority order p as an element has higher priority (priority order) vk. For priority order p, the priority order table shown in (b) in FIG. 9 is referred to. Based on derived priority vk of each of candidates K1 to K8, candidates K1 to K8 are ranked in descending order. It is assumed here that candidate K1 and candidate K2 have a priority order of 1, candidate K3 and candidate K4 have a priority order of 2, candidate K5 has a priority order of 3, candidate K6 and candidate K8 have a priority order of 4, and candidate K7 has a priority order of 5. Then, selector 24 groups candidates K1 to K8 according to the priority order. Because the priority order ranges from 1 to 5, groups G1 to G5 are formed. FIG. 10 shows candidates K1 to K8 that are grouped according to the priority order. Five candidates, namely, candidates K3, K4, K5, K6, and K8, are each composed of two power facilities 3. Candidates K3 and K4 are combinations of power facilities 3 whose priority order p are 1 and 2, respectively, candidate K5 is a combination of power facilities 3 whose priority order p are 1 and 3, and candidates K6 and K8 are combinations of power facilities 3 whose priority order p are 2 and 3, respectively. Accordingly, among candidates K3, K4, K5, K6, and K8 that are each composed of two power facilities 3, candidates K3 and K4 rank highest in the priority order, followed by candidate K5, and candidates K6 and K8 rank lowest in the priority order.

In the case where there are a plurality of candidates that rank the same in the priority order, or in other words, in the case where there are a plurality of candidates in the same group, the priority order in that group is arbitrary. In this example, it is assumed that groups G1, G2, and G4 each include a plurality of candidates, and the priority order in each group in descending order is as follows: in group G1, candidate K1 ranks highest, followed by K2; in group G2, candidate K3 ranks highest, followed by K4; and in group G4, candidate K6 ranks highest, followed by K8. That is, the final priority order (priority vkf) of candidates K1 to K8 in descending order is as follows: K1, K2, K3, K4, K5, K6, K8, and K7.

Selector 24 first selects the candidate having highest priority vkf, namely, candidate K1 having a priority order of 1 as the combination of power facilities 3 that achieves the power adjustment quantity provided from power supply utility 1. In response to the selection, the control mode of each power facility 3 is also selected simultaneously. Then, a DR request is transmitted to power facilities Be[0], Be[1], and Be[2] that constitute candidate combination K1 via second communicator 22. If all of power facilities Be[0], Be[1], and Be[2] accept (opt in) the DR request, DR control is started.

If at least one of power facilities 3 that constitute candidate combination K1 refuses to accept (opt in) the DR request, from among candidate combination group A1 of power facilities 3 excluding candidate K1, the candidate having highest priority vkf, or in other words, the candidate that ranks highest in the priority order is selected. Accordingly, candidate K2 is selected as the combination of power facilities 3 that achieves the power adjustment quantity provided from power supply utility 1 (the control mode of each power facility 3 is also selected simultaneously), and a DR request is also transmitted. The selection of a candidate and the transmission of a DR request are repeated until the DR request is accepted.

As described above, with management apparatus 20 according to the present embodiment, the following operations and effects can be obtained. Selector 24 of management apparatus 20 selects, from among candidates K1 to K8 included in candidate combination group A1 of power facilities 3, a combination of power facilities 3 that achieves the power adjustment quantity provided from power supply utility 1. That is, the selected candidate is the combination of power facilities 3 that achieves the power adjustment quantity. The selection is performed by using opt-in rate r that is the acceptance information regarding the state of acceptance of incentive (compensation), and executing rate e that is the power adjustment achievement information. That is, the combination of power facilities 3 that achieves the power adjustment quantity can be selected by accurately reflecting the response state to DR request of each power facility 3 in the past (the state of acceptance of incentive (compensation) and the power adjustment achievement information). Accordingly, with management apparatus 20, a more accurate combination of power facilities 3 (power consuming utilities) that achieves the power adjustment quantity provided from power supply utility 1 can be automatically selected in aggregator 2.

Selector 24 sets priority for each of candidate combinations K1 to K8 of power facilities 3 based on the response state to DR request of each power facility 3 in the past (the state of acceptance of incentive (compensation) and the power adjustment achievement information). Then, selector 24 selects a combination of power facilities 3 that achieves the power adjustment quantity from among candidate combination group A1 of power facilities 3 in descending order of priority. Accordingly, with management apparatus 20, an even more accurate combination of power facilities 3 that achieves the power adjustment quantity can be more effectively selected in aggregator 2.

Selector 24 selects the combination of power facilities 3 that achieves the power adjustment quantity by using opt-in rate r as the acceptance information regarding the state of acceptance of incentive (compensation), and executing rate e as the power adjustment achievement information. Accordingly, with management apparatus 20, it is possible to even more accurately select, in aggregator 2, a combination of power facilities 3 that are more likely to accept DR request and more likely to achieve the power adjustment quantity.

In the present embodiment, with respect to priority (priority order) vk of each candidate combination of power facilities 3, selector 24 makes a setting such that candidate Kk that has a larger number of power facilities 3 as elements and that includes power facility 3 having higher priority order p as an element has higher priority (priority order) vk. This configuration is suitable for the case where it is necessary to cause a larger number of power facilities 3 (power consuming utilities) to carry out DR request, and it is possible to reduce the burden on each power facility 3. For example, the configuration is suitable for the case where the incentive (compensation) is small, or the case where the power supply and demand state is in hard situation, and a DR request with strong compulsory power is required. Conversely, with respect to priority (priority order) vk of each candidate combination of power facilities 3, selector 24 may make a setting such that a candidate that has a smaller number of power facilities 3 as elements and that includes power facility 3 having higher priority order p as an element has higher priority (priority order) vk. This configuration is suitable for the case where it is necessary to cause a smaller number of power facilities 3 (power consuming utilities) to carry out DR request, and it is possible to reduce the burden on the DR request transmitting side, or in other words, the management burden on the aggregator side. For example, the configuration is suitable for the case where the incentive (compensation) is large, or the case where it is necessary to eliminate the imbalance in the power supply and demand state and require a DR request that performs much less costly operations. The method of setting priority based on the total number of power facilities 3 as elements described here may be configured such that candidate Kk that includes power facility 3 having lower priority order p as an element has higher priority (priority order) vk.

Figure 11:
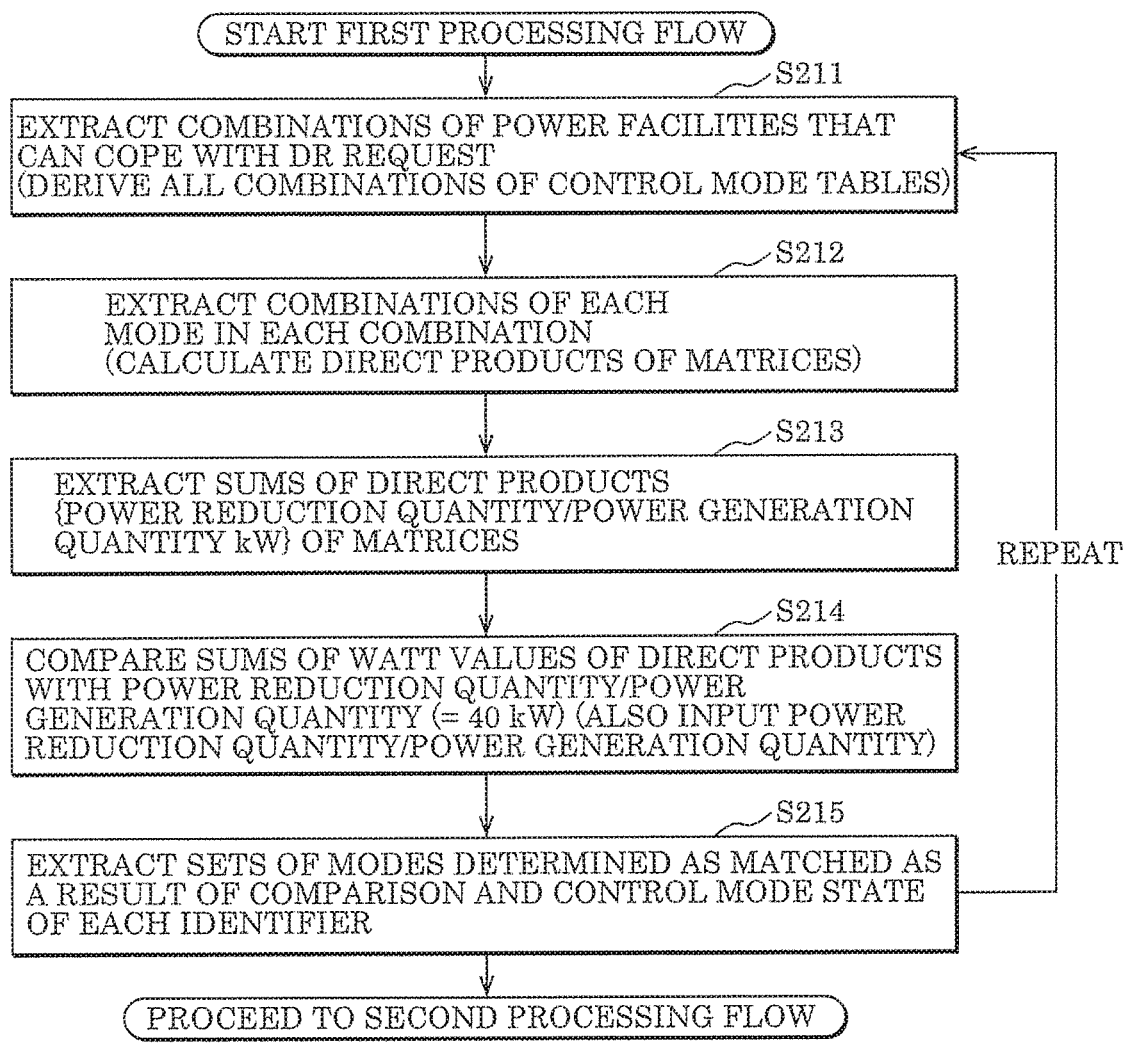
FIG. 11 is a diagram illustrating a processing flow performed by the management apparatus according to the embodiment of the present invention.

Next, specific operations performed by deriver 23 and selector 24 of management apparatus 20 will be described with reference to flowcharts. FIG. 11 is a diagram illustrating a first processing flow performed by deriver 23.

In step S211, deriver 23 extracts combinations of facilities that can cope with DR request (derives all combinations in the control mode table (see FIG. 4)). In this example, deriver 23 extracts all combinations (Be[0], Be[1]), . . . (Be[2]) without any overlapping of identifiers (Be[0], Be[1], Be[2]) of power facilities 3. At the same time, in step S211, processing of calculating direct products of matrices (both watt value and mode value) in each combination is invoked, and the processing is repeated until all sets are processed.

In step S212, deriver 23 extracts a combination of control modes in each combination (calculates direct products of matrices). Sets of watt values of identifiers Be[0], Be[1], and Be[2]: (10, 10, 10), (10, 10, 30), . . . (30, 35, 50) are extracted through calculation of direct products of matrices (the result of extraction is defined as (X)). Also, sets of modes [0] to [3]: (0, 0, 0), (0, 0, 1), . . . (3, 3, 3) are extracted through calculation of direct products of matrices (the result of extraction is defined as (Y)).

In step S213, deriver 23 extracts the sum of power reduction quantity kW or power generation quantity kW of each of direct products of matrices. In this example, the sum of power reduction quantity kW is extracted. Table ($\alpha$) that includes sets having the value of sum of sets of identifiers is extracted from (X) extracted through calculation of direct products.

In step S214, deriver 23 compares the sum of watt value of each direct product with the power adjustment quantity provided from power supply utility 1 (the power reduction quantity or the power generation quantity, in this example, a power reduction quantity of 40 kW is used). Table ($\beta$) that includes sets that match the input power reduction quantity (=40 kW) is extracted from table ($\alpha$).

In step S215, sets of control modes that have been determined as matched as a result of the comparison and the control mode state of each identifier are extracted. Table ($\gamma$) in which the control mode has been merged is extracted from the extracted table ($\beta$) and corresponding (Y) extracted through calculation of direct products. After that, the procedure proceeds to a second processing flow. In the first processing flow, eventually, candidate combinations K1 to K8 of power facilities 3 shown in FIG. 7 that are candidates that achieve the power adjustment quantity provided from power supply utility 1 are extracted.

Figure 12:
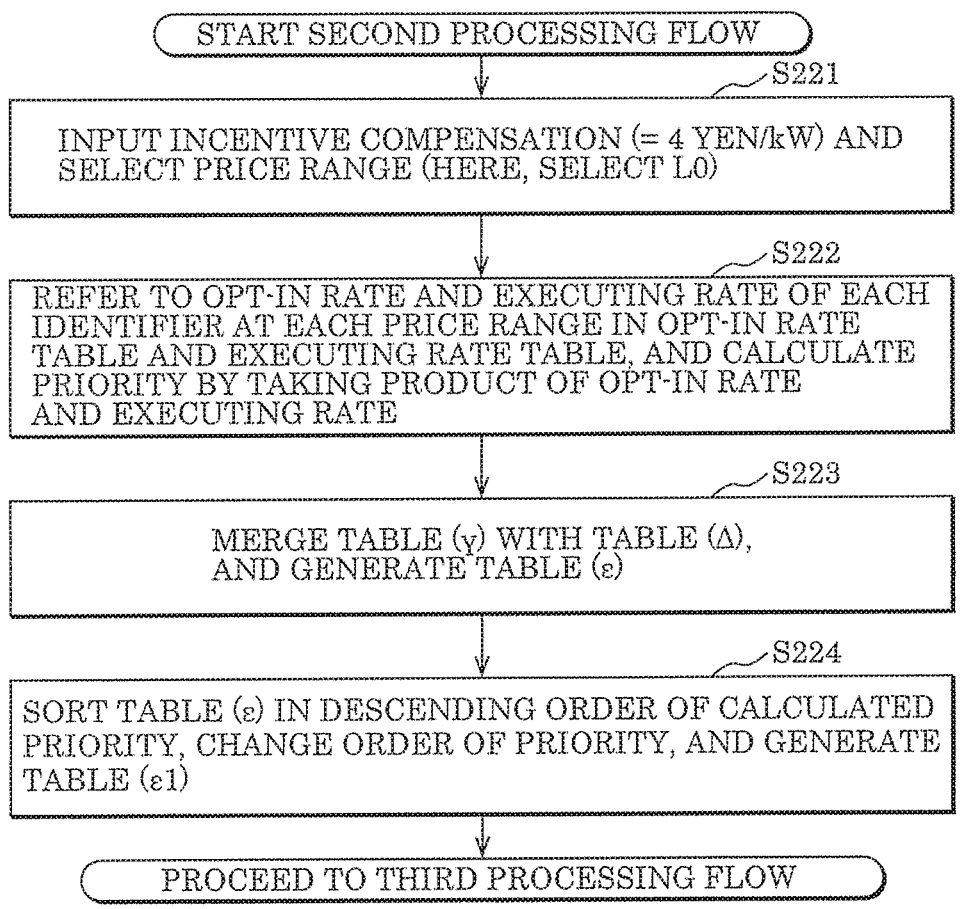
FIG. 12 is a diagram illustrating a processing flow performed by the management apparatus according to the embodiment of the present invention.

Selector 24 first executes the second processing flow shown in FIG. 12.

In step S221, selector 24 performs input of incentive (compensation) (=4 yen/kW), and selection of a price range (in this example, price range L0 is selected). Based on the incentive (compensation=4 yen/kW) received from power supply utility 1 (including an upper aggregator), price range L0 corresponding to the incentive is extracted from the price range table (see FIG. 3) prepared in advance.

Figure 13:
FIG. 13 is a diagram showing a priority table used by the management apparatus according to the embodiment of the present invention.

In step S222, selector 24 refers to opt-in rate r of each of the identifiers of power facilities 3 at price range L0 in the opt-in rate table (see FIG. 4) and executing rate e of all price ranges in the executing rate table (see FIG. 5). Then, by taking the product of opt-in rate r and executing rate e, priority v of each identifier of power facility 3 is calculated, as a result of which table ($\Delta$) is generated. For example, priority v of power facility 3 with identifier Be[0] at price range L0 is calculated by multiplying opt-in rate r by executing rate e, specifically, calculated to be 1600 by multiplying 20 by 80. FIG. 13 shows a priority table that is table ($\Delta$) (in which opt-in rate r, executing rate e, and priority v are listed).

In step S223, selector 24 merges table ($\gamma$) with table ($\Delta$) to generate table ($\epsilon$). That is, table ($\gamma$) obtained from combinations of watt calculation and combinations of control modes (the result of calculation of direct products of matrices) is merged with component values obtained from table ($\Delta$) shown in FIG. 13 in which priority v was calculated, and table ($\epsilon$) is generated in which priority vk of each of candidate combinations K1 to K8 of power facilities 3 is derived. Priority vk of each of candidates K1 to K8 is derived based on priority order p of each power facility 3 and the total number of power facilities 3 that constitute candidate Kk (the total number of power facilities 3 that are elements of candidate Kk). In this example, as described above, as an example, it is assumed that candidate Kk that has a larger number of power facilities 3 as elements and that includes power facility 3 having higher priority order p as an element has higher priority (priority order) vk.

In step S224, selector 24 sorts table ($\epsilon$) in descending order of priority vk so as to generate table ($\epsilon$1) in which priority vk has been converted to priority order. The conversion of priority vk to priority order can be performed based on the same idea as, for example, the conversion of priority v shown in (a) in FIG. 9 to priority order p shown in (b) in FIG. 9. After that, the procedure proceeds to a third processing flow.

Figure 14:
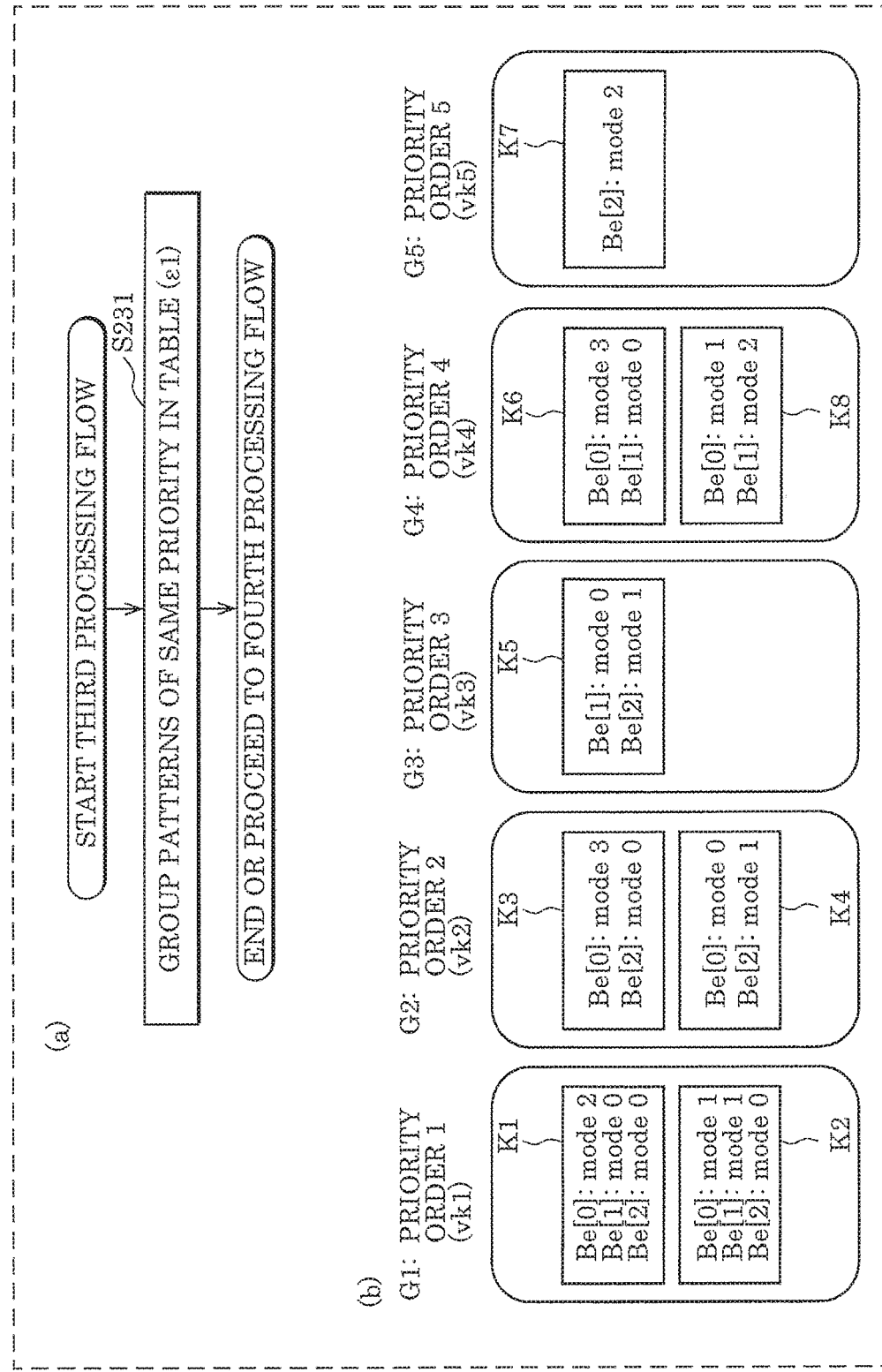
FIG. 14 is a diagram illustrating a processing flow performed by the management apparatus according to the embodiment of the present invention.

Next, selector 24 executes the third processing flow shown in FIG. 14.

In step S231 shown in (a) in FIG. 14, selector 24 groups candidates K1 to K8 according to the priority order as shown in (b) in FIG. 14 by using the priority order (priority vk) of each of candidate combinations K1 to K8 of power facilities 3 in table ($\epsilon$1). As described above, candidates K1 to K8 that have been grouped according to the priority order are shown in FIG. 10. The processing operation in step S231 will be described more specifically. Candidates K1 to K8 are ranked in descending order of priority vk of candidates K1 to K8. Candidate K1 and candidate K2 have a priority order of 1, candidate K3 and candidate K4 have a priority order of 2, candidate K5 has a priority order of 3, candidate K6 and candidate K8 have a priority order of 4, and candidate K7 has a priority order of 5. Then, candidates K1 to K8 are grouped according to the priority order. Because the priority order ranges from 1 to 5, groups G1 to G5 are formed. In the case where there are a plurality of candidates that rank the same in the priority order, or in other words, in the case where there are a plurality of candidates in the same group, the priority order in that group is arbitrary. In this example, it is assumed that groups G1, G2, and G4 each include a plurality of candidates, and the priority order in each group in descending order is as follows: in group G1, candidate K1 ranks highest, followed by K2; in group G2, candidate K3 ranks highest, followed by K4; and in group G4, candidate K6 ranks highest, followed by K8. That is, the final priority order (priority vkf) of candidates K1 to K8 in descending order is as follows: K1, K2, K3, K4, K5, K6, K8, and K7.

After the processing in step S231 ends, the processing flow ends unless the DR request is performed immediately. In the case of performing the DR request, the procedure proceeds to a fourth processing flow.

Figure 15:
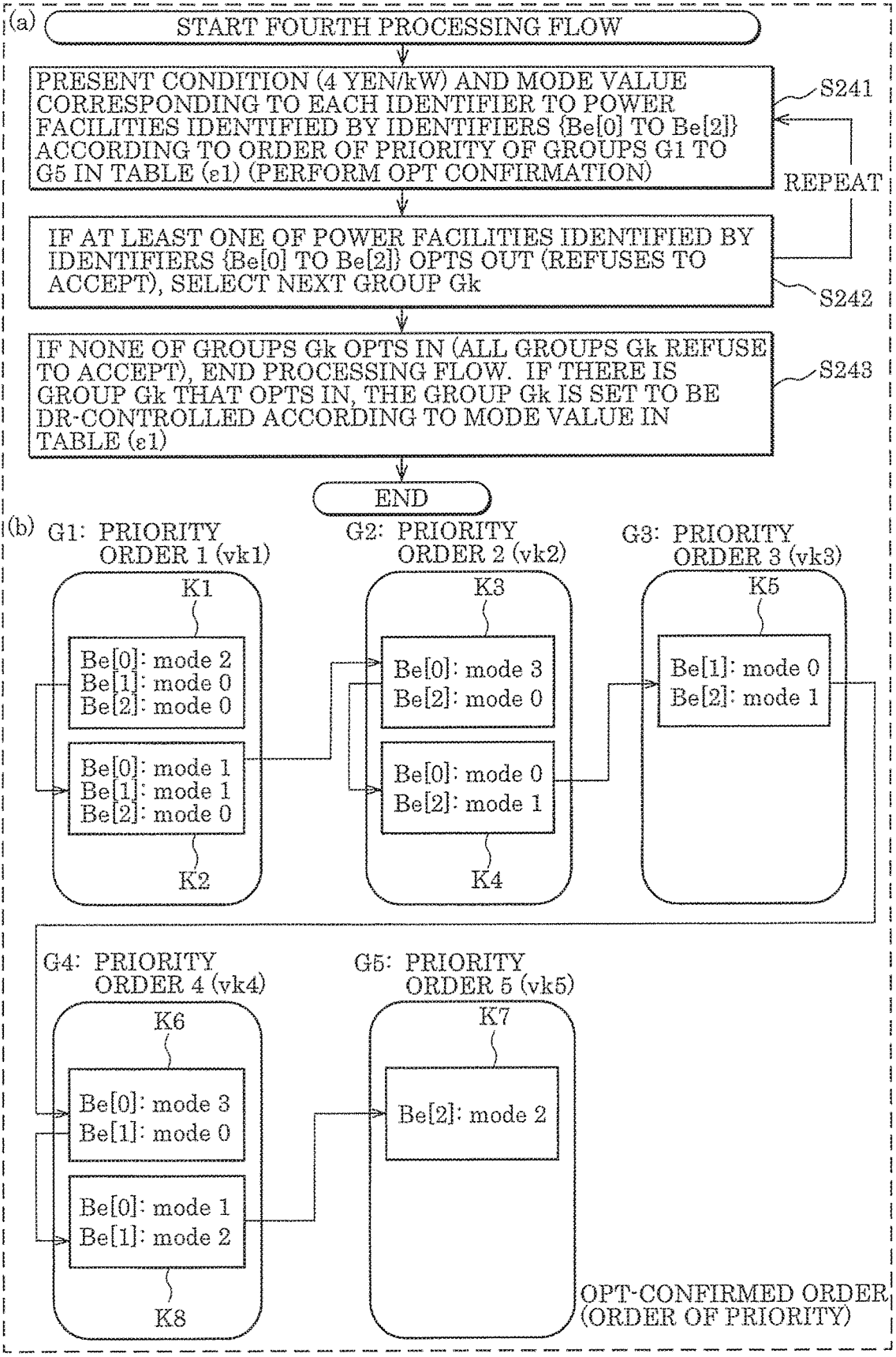
FIG. 15 is a diagram illustrating a processing flow performed by the management apparatus according to the embodiment of the present invention.

Next, selector 24 executes the fourth processing flow shown in FIG. 15.

In step S241 shown in (a) in FIG. 15, selector 24 presents, to each of power facilities 3 identified by identifiers Be[0], Be[1], and Be[2] according to the priority order of group G1 to group G5 in table (ε1), a condition (compensation: 4 yen/kW) and a control mode value (mode value) corresponding to the identifier. This is opt confirmation processing of confirming whether or not to accept DR request, which is performed in descending order of the priority of candidates. In this example, as shown in (b) in FIG. 15, a DR request (compensation and control mode value) is first transmitted to each of power facilities Be[0], Be[1], and Be[2] that constitute candidate K1 in group G1 having the final highest priority vkf, or in other words, a priority order of 1.

In step S242, if at least one of power facilities 3 identified by identifiers Be[0], Be[1], and Be[2] opts out (refuses to accept) the DR request, selector 24 selects group Gk having the next highest priority, or another candidate in the same group if there is any in the group. In this example, group G1 having a priority order of 1 includes another candidate, namely, candidate K2 (the candidate having the final highest priority next to candidate K1), and thus candidate K2 is selected as the candidate to be subjected to opt confirmation processing, and the processing in step S241 is again performed. In other words, from among candidate combination group A1 of power facilities 3 excluding candidate K1, candidate K2 that is the candidate that ranks highest in the priority order is selected, and opt confirmation processing is performed. Then, step S241 and step S242 are repeated until a candidate that accepts (opts in) DR request is found.

In step S243, if none of groups Gk opts in (accepts) DR request (all of candidates K1 to K8 do not opt in (accept) DR request), the processing of flow 4 ends. If any one of candidates opts in (accepts) DR request, group Gk (candidate Kk) that has opted in is set to be subjected to DR control according to the mode value in table (ε1). Then, the fourth processing flow ends.

Here, an example will be considered in which candidate K2 that is one of the candidate combinations of power facilities 3 included in group G1 is selected as the candidate to be subjected to opt confirmation processing, and power facility 3 having identifier Be[0] to which a mode value (control mode value) of 1 has been presented opts out DR request. Other than candidate K2, candidate K8 of group G4 includes a set of identifier Be[0] of power facility 3 and a mode value of 1 as an element of the candidate combination of power facilities 3. Because candidate K8 is also a candidate that will not opt in DR request, performing opt confirmation processing on candidate K8 will be redundant opt confirmation processing.

Figure 16:
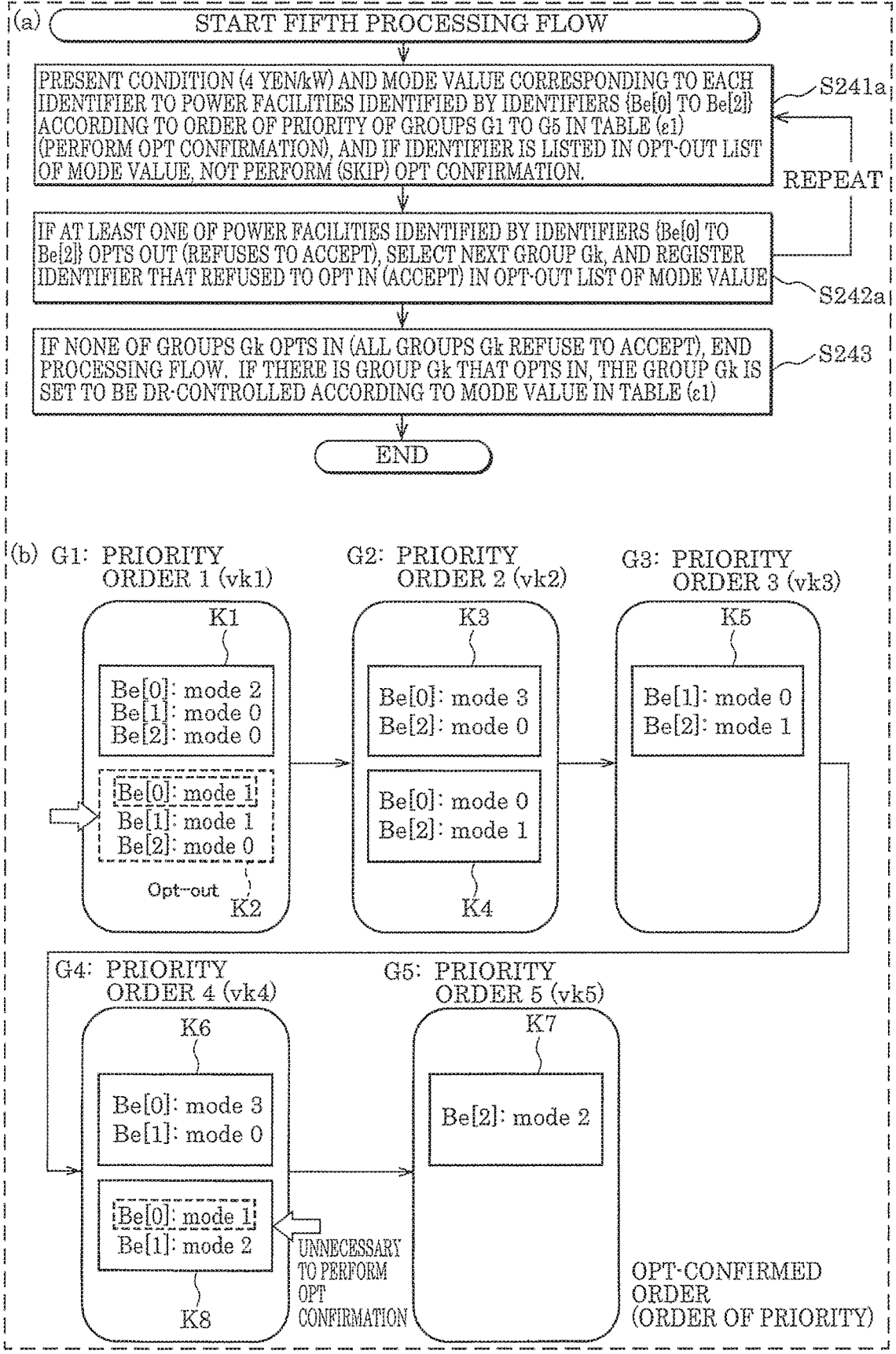
FIG. 16 is a diagram illustrating a processing flow performed by the management apparatus according to the embodiment of the present invention.

Accordingly, a fifth processing flow for avoiding such redundant opt confirmation processing is shown in FIG. 16. The fifth processing flow may replace the fourth processing flow. In this example, the fifth processing flow will be described focusing on differences from the fourth processing flow.

Steps S241a and S242a shown in (a) in FIG. 16 are steps corresponding to steps S241 and S242 of the fourth processing flow. The fifth processing flow is configured to include an opt-out list in which the identifiers of power facilities 3 that opted out are listed together with the mode values for which power facilities 3 opted out. Selector 24 sets a candidate to be subjected to opt confirmation processing in step S241a as candidate Kk. If the opt-out list includes, in a mode value corresponding to the mode value to be presented as a DR request, an identifier of power facility 3 to which the mode value is to be presented, opt confirmation processing will not be performed on that candidate Kk. That is, that candidate Kk is skipped, and candidate Kn having the next highest priority is set as the candidate to be subjected to opt confirmation processing. Then, comparison is made with respect to the opt-out list in the same manner. This processing is repeated.

In step S242a, selector 24 registers the identifier of power facility 3 that opted out (refused to accept) DR request included in candidate Kn that has been subjected to opt confirmation processing in step S241a in the presented mode value in the opt-out list. Then, step S241a and step S242a are repeated until a candidate that accepts (opts in) DR request is found. The next step, namely, step S243 is the same as step S243 of the fourth processing flow shown in FIG. 15, and thus a description thereof is omitted here.

The operations of the fifth processing flow may be expressed as follows. It is assumed that as the candidate combination to be subjected to opt confirmation processing (or in other words, as the combination of power facilities 3 that achieves the power adjustment quantity), candidate K2 that is one of the candidate combinations of power facilities 3 included in group G1 is selected. Then, as shown in (b) in FIG. 16, it is assumed that power facility 3 having identifier Be[0] to which a mode value (control mode value) of 1 has been presented opts out DR request. At this time, other than candidate K2, candidate K8 of group G4 includes a set of identifier Be[0] of power facility 3 that has opted out DR request and a mode value of 1 as an element of the candidate combination of power facilities 3.

Accordingly, selector 24 excludes, from among candidate combination group A1 of power facilities 3, candidate K2 and candidate K8 that include the set of identifier Be[0] of power facility 3 that has opted out DR request and a mode value of 1 as an element. Then, as the candidate combination to be subjected to opt confirmation processing (or in other words, as the combination of power facilities 3 that achieves the power adjustment quantity), selector 24 selects, from among candidates K3 to K7 having lower priority than already selected candidate K2, a new candidate to be subjected to opt confirmation processing in descending order of priority. That is, selector 24 selects, from among the group of candidates (candidates K3 to K7) having lower priority than candidate K2 excluding candidate K8, a new combination of power facilities 3 that achieves power adjustment quantity in descending order of priority.

As described above, according to the fifth processing flow performed by selector 24, management apparatus 20 can be configured to not select, as a new candidate to be subjected to opt confirmation processing, a candidate combination of power facilities 3 that includes the same set as the set of the identifier of power facility 3 that refused to accept the DR request and the corresponding mode value as an element. That is, management apparatus 20 can be configured to not select such a candidate combination as a new combination of power facilities 3 that achieves the power adjustment quantity. Accordingly management apparatus 20 can reduce the transmission operation of DR request, and even more effectively select a new combination of power facilities 3 that achieves the power adjustment quantity.

Here, the control rules of the demand response (DR) system may include a rule where power facility 3 that once accepted a DR request and carried out power adjustment cannot accept a DR request for, for example, two days after that. An example will be considered in which as the combination of power facilities 3 that achieves the power adjustment quantity, candidate Ka including a large number of power facilities 3 as elements (a large number of power facilities 3 that are combined) has higher priority. For example, it is assumed that on the first day of five days designated as a power adjustment period, candidate Ka is selected as the combination of power facilities 3 that achieves the power adjustment quantity, and candidate Ka executes a DR request. On the second day and the third day, only a candidate that does not include power facilities 3 having identifiers included in candidate Ka as elements can be selected as the candidate. Accordingly, as the total number of power facilities 3 that constitute candidate Ka increases, the number of candidates selected on the second day and the third day is limited.

Figure 17:
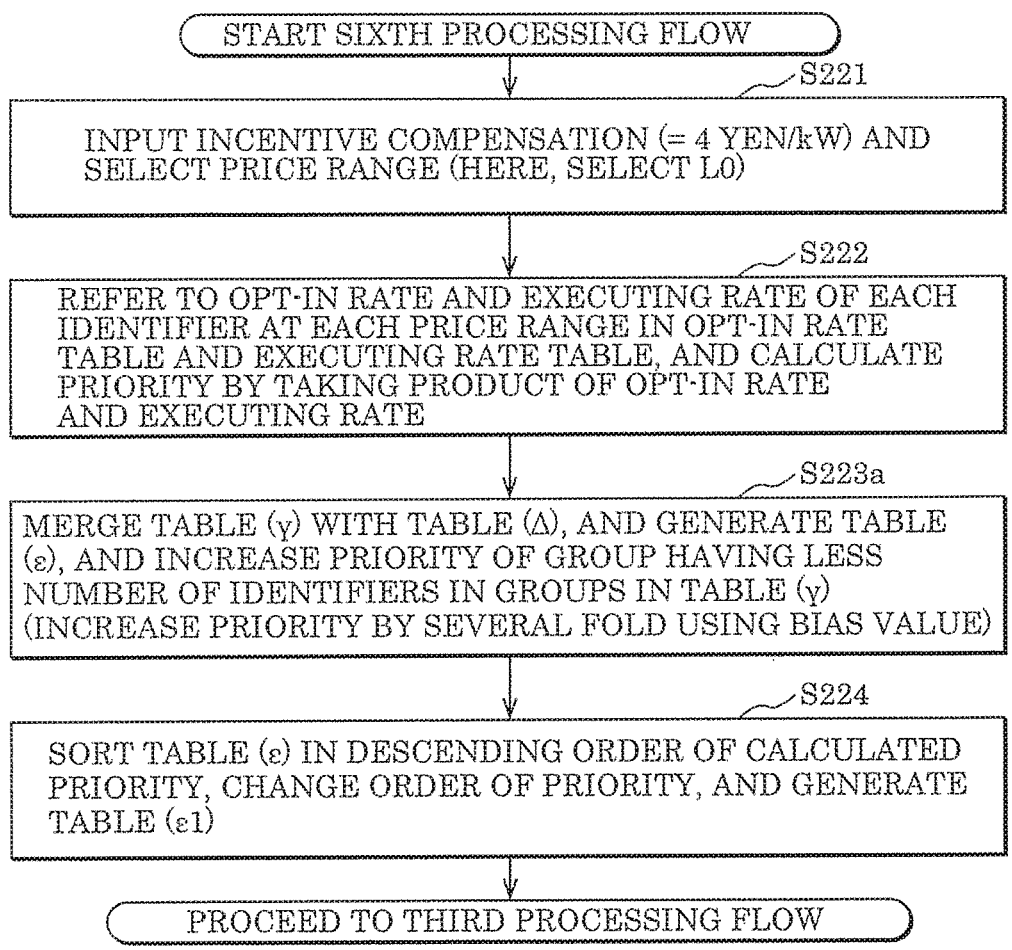
FIG. 17 is a diagram illustrating a processing flow performed by the management apparatus according to the embodiment of the present invention.

Thus, an example of a sixth processing flow is shown in FIG. 17 in which priority (priority order) vk of the candidate combination of power facilities 3 is set to be higher for a candidate that has a smaller number of power facilities 3 as elements and that includes power facility 3 having higher priority order p as an element. The sixth processing flow shown in FIG. 17 can replace the second processing flow shown in FIG. 12, and among the four steps, three steps, namely, steps S221, S222, and S224 are the same as those of the second processing flow. In this example, step S223a that is a step different from the second processing flow will be described.

In step S223a, selector 24 merges table ($\gamma$) with table ($\Delta$) to generate table ($\varepsilon$). That is, table ($\gamma$) obtained from combinations of watt calculation and combinations of control modes (the result of calculation of direct products of matrices) is merged with component values obtained from table ($\Delta$) shown in FIG. 13 in which priority v was calculated, and table ($\varepsilon$) is generated in which priority vk of each of candidate combinations K1 to K8 of power facilities 3 is derived. At this time, higher priority is given to a group having a small number of identifiers of power facilities 3 included in each group in table ($\gamma$) (the priority is increased by several fold by using a bias value).

With this configuration, priority vk of each of candidates K1 to K8 is set to be higher for a candidate that has a smaller number of power facilities 3 as elements and that includes power facility 3 having higher priority in the priority order as an element. As an example, the final priority order (priority vkf) of candidates K1 to K8 in descending order is as follows: K7, K3, K4, K5, K6, K8, K1, and K2. By adjusting the bias value, it is possible to adjust the degree of influence of the total number of power facilities 3 on priority vk of each of candidates K1 to K8. Also, depending on the situation, control may be performed such that a candidate having a large number of power facilities 3 has higher priority.

As described above, according to the sixth processing flow performed by selector 24, management apparatus 20 can adjust the priority of the candidate combination of power facilities 3 that achieves the power adjustment quantity according to the total number of power facilities 3 that constitute the candidate. Accordingly, with management apparatus 20, in the aggregator, it is possible to select the combination of power facilities 3 that achieves the power adjustment quantity by using the priority to which the total number of power facilities 3 that constitute the candidate combination of power facilities 3 is reflected.

A trouble may occur in which after power facility 3 included in the selected combination of power facilities 3 accepted a DR request, that power facility 3 cannot execute power adjustment. In this case, a configuration may be used in which in step S303 shown in FIG. 2, power facility 3 transmits an event execution error message to management apparatus 20 of aggregator 2. Upon receiving the event execution error message, management apparatus 20 selects a candidate combination of power facilities 3 that has the next lower priority than the combination of power facilities 3 selected in step S202. The selected candidate serves as a new combination of power facilities 3 that achieves the power adjustment quantity. In step S203, a new DR request message is transmitted to power facilities 3 that constitute the newly selected combination of power facilities 3. In this way, a recovery operation is performed.

The recovery operation may be expressed as follows. An error may occur in which after the combination of power facilities 3 that achieves the power adjustment quantity, which was selected by selector 24, that had once accepted a DR request, power facility 3 included in the combination of power facilities 3 does not execute the DR request. In this case, management apparatus 20 receives an event execution error message from power facility 3. Then, selector 24 selects, from among the candidate combinations of power facilities 3 having lower priority than that of the already selected combination of power facilities 3, a new combination of power facilities 3 that achieves the power adjustment quantity in descending order of priority. Management apparatus 20 transmits a new DR request message to power facilities 3 that constitute the newly selected combination of power facilities 3.

The aggregator including management apparatus 20 as described above can efficiently perform the recovery operation even in the event of the occurrence of an error in which DR request is not executed.

Other Embodiments

In the management apparatus according to the embodiment described above, a classifier may be provided that classifies power facilities 3 that are power consuming utilities into a plurality of power facility groups according to a predetermined condition. For example, the classifier generates power facility groups according to the region where power facility 3 is installed. Then, deriver 23 selects one from among the power facility groups, and extracts, from among the selected power facility group, candidate combinations of power facilities 3 based on instruction information transmitted from the power supply utility side. Deriver 23 derives a group of candidate combinations of power facilities 3 that includes a plurality of extracted candidate combinations of power facilities 3. In this case, it is possible to reduce the processing load on deriver 23 when the total number of power facilities 3 increases.

Also, in the embodiment described above, power facilities 3 that are power consuming utilities are used as elements of the candidate that achieves the power adjustment quantity, but other aggregators may be used as the elements.

Also, in the embodiment already described above, the functions of management apparatus 20 may be implemented by using a program executed by a computer. That is, the present embodiment includes a program for causing a computer to implement the functions of management apparatus 20. The program may be read from a recording medium and installed on a computer, or may be transmitted via a network and installed on a computer.

As described above, management apparatus 20 according to the present embodiment is management apparatus 20 included in aggregator 2 that transmits a demand response request for power quantity adjustment to a plurality of power facilities 3 that are power consuming utilities. Management apparatus 20 includes: first communicator 21 that acquires instruction information including a power adjustment quantity transmitted from power supply utility 1 side; second communicator 22 that acquires, from response state information regarding a state of response to the demand response request transmitted from the plurality of power facilities 3, response information including acceptance information and power adjustment achievement information of the plurality of power facilities 3, the acceptance information being information regarding a state of acceptance of incentive for power adjustment in a past; deriver 23 that extracts, based on the instruction information, a plurality of candidate combinations of power facilities 3 that are candidates that achieve the power adjustment quantity from among the plurality of power facilities 3, and derives a group of candidate combinations of power facilities 3 that includes the plurality of candidate combinations of power facilities extracted; and selector 24 that selects, based on the response information, a combination of power facilities 3 that achieves the power adjustment quantity from among the group of candidate combinations of power facilities 3.

With this configuration, in aggregator 2, management apparatus 20 can automatically select a more accurate combination of power consuming utilities (power facilities 3) that achieves the power adjustment quantity provided from power supply utility 1 side.

Also, selector 24 may set priority for each of candidate combinations of power facilities 3 based on the response information, and select a combination of power facilities 3 that achieves the power adjustment quantity in descending order of priority from among the group of candidate combinations of power facilities 3.

Also, selector 24 may adjust priority according to the total number of power facilities 3 that constitute a candidate combination of power facilities 3.

Also, the acceptance information may be an opt-in rate that indicates a ratio of acceptance of the demand response request to the incentive presented to each of the plurality of power facilities 3, and the achievement information may be an executing rate of each of the plurality of power facilities 3, the executing rate indicating a ratio of an actually achieved value to the adjustment quantity indicated by the demand response request.

Also, the following configuration is possible: an element of each of the candidate combinations of power facilities 3 includes a set of power facility information indicating one of the plurality of power facilities 3 and control mode information indicating a power adjustment quantity of the one of the plurality of power facilities, after aggregator 2 has transmitted a demand response request for achieving the power adjustment quantity to the combination of power facilities 3 selected by selector 24, if at least one of power facilities 3 included in the selected combination of power facilities 3 refuses to accept the demand response request, selector 24 excludes, from among the group of candidate combinations of power facilities 3, a candidate combination of power facilities 3 including an element having a same set as the set of power facility information indicating power facility 3 that refused to accept the demand response request and control mode information of power facility 3, and selects a new combination of power facilities 3 that achieves the power adjustment quantity in descending order of the priority from among the candidate combinations of power facilities 3 having priority lower than the priority of the selected combination of power facilities 3.

Also, if, after having received a demand response request for achieving the power adjustment quantity transmitted from aggregator 2, the combination of power facilities selected by selector 24 does not execute the demand response request, selector 24 may select a new combination of power facilities 3 that achieves the power adjustment quantity in descending order of the priority from among the candidate combinations of power facilities 3 having priority lower than the priority of the selected combination of power facilities 3.

Also, the management method according to the present embodiment is a management method that is executed by management apparatus 20 included in aggregator 20 that transmits a demand response request for power quantity adjustment to a plurality of power facilities 3 that are power consuming utilities, the management method including: acquiring instruction information including a power adjustment quantity transmitted from power supply utility side 1; acquiring, from response state information regarding a state of response to the demand response request transmitted from the plurality of power facilities 3, response information including acceptance information and power adjustment achievement information of the plurality of power facilities 3, the acceptance information being information regarding a state of acceptance of incentive for power adjustment in a past; extracting, based on the instruction information, a plurality of candidate combinations of power facilities 3 that are candidates that achieve the power adjustment quantity from among the plurality of power facilities 3, and deriving a group of candidate combinations of power facilities 3 that includes the plurality of candidate combinations of power facilities 3 extracted; and selecting, based on the response information, a combination of power facilities 3 that achieves the power adjustment quantity from among the group of candidate combinations of power facilities 3.

Also, the management program according to the present embodiment is a management program for causing a computer to function as management apparatus 20 included in aggregator 20 that transmits a demand response request for power quantity adjustment to a plurality of power facilities that are power consuming utilities, the management program causing the computer to function as: first communicator 21 that acquires instruction information including a power adjustment quantity transmitted from power supply utility 1 side; second communicator 22 that acquires, from response state information regarding a state of response to the demand response request transmitted from the plurality of power facilities 3, response information including acceptance information and power adjustment achievement information of the plurality of power facilities 3, the acceptance information being information regarding a state of acceptance of incentive for power adjustment in a past; deriver 23 that extracts, based on the instruction information, a plurality of candidate combinations of power facilities 3 that are candidates that achieve the power adjustment quantity from among the plurality of power facilities 3, and derives a group of candidate combinations of power facilities 3 that includes the plurality of extracted candidate combinations of power facilities 3; and selector 24 that selects, based on the response information, a combination of power facilities 3 that achieves the power adjustment quantity from among the group of candidate combinations of power facilities 3.

With the configuration described above, the same effects as those of management apparatus 20 described above can be achieved.

(Others)

The management apparatus and the like according to the present invention have been described by way of the embodiment given above, but the present invention is not limited to the above embodiment.

The present invention also encompasses other embodiments obtained by making various modifications that can be conceived by a person having ordinary skill in the art to the above embodiment as well as embodiments implemented by any combination of the structural elements and the functions of the above embodiment without departing from the scope of the present invention.

REFERENCE MARKS IN THE DRAWINGS 1 power supply utility
2 aggregator
3 power facility (power consuming utility)
20 management apparatus
21 first communicator (first acquirer)
22 second communicator (second acquirer)
23 deriver
24 selector
25 storage (second acquirer)
A1 candidate group
K1 to K8 candidate

The invention claimed is:

1. A management apparatus included in an aggregator that transmits a demand response request for power quantity adjustment to a plurality of power facilities that are power consuming utilities, the management apparatus includes functions that are implemented by using a program executed by a computer, the program for causing the computer to implement the functions of the management apparatus, comprising:
  a first acquirer that acquires instruction information including a power adjustment quantity transmitted from a power supply utility;
  a second acquirer that acquires, from response state information regarding a state of response to the demand response request transmitted from the plurality of power facilities, response information including acceptance information and power adjustment achievement information of the plurality of power facilities, the acceptance information being information regarding a state of acceptance of incentive for power adjustment in a past;
  a deriver that extracts, based on the instruction information, a plurality of candidate combinations of power facilities that achieve the power adjustment quantity from among the plurality of power facilities, and derives a group of candidate combinations of power facilities that includes the plurality of candidate combinations of power facilities extracted; and
  a selector that selects, based on the response information, a combination of power facilities that achieves the power adjustment quantity from among the group of candidate combinations of power facilities,
    wherein the selector sets, based on the response information, a priority for each of the candidate combinations of power facilities, and selects the combination of power facilities that achieves the power adjustment quantity from among the group of candidate combinations of power facilities in descending order of the priority, and
    wherein the selector adjusts the priority according to a total number of power facilities that constitute each of the candidate combinations of power facilities.

2. The management apparatus according to claim 1,
wherein the acceptance information is an opt-in rate that indicates a ratio of acceptance of the demand response request to the incentive presented to each of the plurality of power facilities, and
the power adjustment achievement information is an executing rate of each of the plurality of power facilities, the executing rate indicating a ratio of an actually achieved value to the power adjustment quantity indicated by the demand response request.

3. The management apparatus according to claim 1,
wherein an element of each of the candidate combinations of power facilities includes a first set of power facility information indicating one of the plurality of power facilities and control mode information indicating a power adjustment quantity of the one of the plurality of power facilities,
after the aggregator has transmitted a demand response request for achieving the power adjustment quantity to the combination of power facilities selected by the selector, if at least one of power facilities included in the selected combination of power facilities refuses to accept the demand response request,
the selector excludes, from among the group of candidate combinations of power facilities, a candidate combination of power facilities that includes an element having a set the same as the first set of power facility information indicating the power facility that refused to accept the demand response request and control mode information of the power facility, and selects a new combination of power facilities that achieves the power adjustment quantity in descending order of the priority from among the candidate combinations of power facilities having priority lower than the priority of the selected combination of power facilities.

4. The management apparatus according to claim 1,
wherein if, after having received a demand response request for achieving the power adjustment quantity transmitted from the aggregator, the combination of power facilities selected by the selector does not execute the demand response request,
the selector selects a new combination of power facilities that achieves the power adjustment quantity in descending order of the priority from among the candidate combinations of power facilities having priority lower than the priority of the selected combination of power facilities.

5. A management method that is executed by a management apparatus included in an aggregator that transmits a demand response request for power quantity adjustment to a plurality of power facilities that are power consuming utilities, the management apparatus includes functions that are implemented by using a program executed by a computer, the program causing the computer to implement the functions of the management apparatus, the management method comprising:
  acquiring instruction information including a power adjustment quantity transmitted from a power supply utility;
  acquiring, from response state information regarding a state of response to the demand response request transmitted from the plurality of power facilities, response information including acceptance information and power adjustment achievement information of the plurality of power facilities, the acceptance information being information regarding a state of acceptance of incentive for power adjustment in a past;

extracting, based on the instruction information, a plurality of candidate combinations of power facilities that achieve the power adjustment quantity from among the plurality of power facilities, and deriving a group of candidate combinations of power facilities that includes the plurality of candidate combinations of power facilities extracted; and selecting, based on the response information, a combination of power facilities that achieves the power adjustment quantity from among the group of candidate combinations of power facilities, wherein the selecting includes setting a priority for each of the candidate combinations of power facilities, and selecting the combination of power facilities that achieves the power adjustment quantity from among the group of candidate combinations of power facilities in descending order of the priority, and wherein the selecting includes adjustment of the priority according to a total number of power facilities that constitute each of the candidate combinations of power facilities.

6. A non-transitory computer-readable recording medium having a management program recorded thereon, the management program for causing a computer to function as a management apparatus included in an aggregator that transmits a demand response request for power quantity adjustment to a plurality of power facilities that are power consuming utilities, the management program causing the computer to function as:

a first acquirer that acquires instruction information including a power adjustment quantity transmitted from a power supply utility;

a second acquirer that acquires, from response state information regarding a state of response to the demand response request transmitted from the plurality of power facilities, response information including acceptance information and power adjustment achievement information of the plurality of power facilities, the acceptance information being information regarding a state of acceptance of incentive for power adjustment in a past;

a deriver that extracts, based on the instruction information, a plurality of candidate combinations of power facilities that achieve the power adjustment quantity from among the plurality of power facilities, and derives a group of candidate combinations of power facilities that includes the plurality of candidate combinations of power facilities extracted; and a selector that selects, based on the response information, a combination of power facilities that achieves the power adjustment quantity from among the group of candidate combinations of power facilities, wherein the selector sets, based on the response information, a priority for each of the candidate combinations of power facilities, and selects the combination of power facilities that achieves the power adjustment quantity from among the group of candidate combinations of power facilities in descending order of the priority, and wherein the selector adjusts the priority according to a total number of power facilities that constitute each of the candidate combinations of power facilities.

* * * * *